United States Patent
Bolz (10) Patent No.: US 8,019,569 B2
(45) Date of Patent: Sep. 13, 2011

(54) METHOD FOR CHECKING A VALVE

(75) Inventor: Stephan Bolz, Pfatter (DE)

(73) Assignee: Siemens Aktiengesellschaft, Munich (DE)

( * ) Notice: Subject to any disclaimer, the term of this patent is extended or adjusted under 35 U.S.C. 154(b) by 570 days.

(21) Appl. No.: 11/584,269

(22) Filed: Oct. 20, 2006

(65) Prior Publication Data

US 2007/0090315 A1     Apr. 26, 2007

(30) Foreign Application Priority Data

Oct. 20, 2005   (DE) .................... 10 2005 050 338

(51) Int. Cl.
*F16K 31/02*    (2006.01)

(52) U.S. Cl. ........ 702/150; 324/418; 324/423; 324/545; 324/415; 340/644; 361/152; 251/285; 251/129.04; 702/114; 73/1.72

(58) Field of Classification Search .......... 702/113–115, 702/150; 324/418, 423, 545, 415; 340/644; 361/152; 251/285, 129.04
See application file for complete search history.

(56) References Cited

U.S. PATENT DOCUMENTS

| | | | | |
|---|---|---|---|---|
| 4,394,742 A * | 7/1983 | Crummer et al. | ............. | 701/102 |
| 5,182,517 A | 1/1993 | Thelen et al. | | |
| 5,954,030 A * | 9/1999 | Sturman et al. | ............... | 123/446 |
| 6,089,533 A * | 7/2000 | Bubeck et al. | .................. | 251/75 |
| 6,332,453 B1 * | 12/2001 | Yamakado et al. | ........... | 123/490 |
| 6,606,551 B2 | 8/2003 | Ito | | |
| 6,840,228 B2 * | 1/2005 | Yomogida et al. | ............ | 123/494 |
| 7,309,025 B2 * | 12/2007 | Yamazaki et al. | ................. | 239/5 |
| 7,313,497 B2 * | 12/2007 | Breen et al. | .................... | 702/114 |
| 2003/0106365 A1 | 6/2003 | Satoh et al. | | |
| 2003/0112504 A1 | 6/2003 | Czarnetzki et al. | | |
| 2003/0229440 A1 | 12/2003 | Tanaka et al. | | |
| 2004/0021936 A1 | 2/2004 | Czarnetzki et al. | | |
| 2004/0088130 A1 * | 5/2004 | Weiland | ........................ | 702/114 |

(Continued)

FOREIGN PATENT DOCUMENTS

DE      32 44 940 C2      6/1984

(Continued)

OTHER PUBLICATIONS

European Search Report dated Sep. 3, 2008.

(Continued)

*Primary Examiner* — Carol S Tsai (74) *Attorney, Agent, or Firm* — Laurence A. Greenberg; Werner H. Stemer; Ralph E. Locher (57) ABSTRACT

A valve has a valve piston, at least one coil and at least one magnetized component. An induction voltage is induced in the at least one coil, by a movement of the valve piston in the valve through a magnetic field produced by the magnetized component. A reference point is acquired, which is representative of a start of a current activation cycle of the valve. In the current activation cycle a point is determined as a function of a characteristic pattern of the induction voltage, which is representative of an end of a movement process of the valve piston in the valve. A current response time is determined as a function of the point and the reference point. At least one error condition is determined as a function of the response time. An error is identified, when the at least one error condition is satisfied.

14 Claims, 5 Drawing Sheets

U.S. PATENT DOCUMENTS

| | | |
|---|---|---|
| 2004/0129858 A1 | 7/2004 | Czarnetzki et al. |
| 2005/0030691 A1 | 2/2005 | Bolz et al. |
| 2005/0234673 A1* | 10/2005 | Saitoh et al. ............ 702/114 |
| 2006/0081806 A1* | 4/2006 | Doubrawa ............ 251/285 |
| 2007/0102620 A1 | 5/2007 | Bublitz et al. |

FOREIGN PATENT DOCUMENTS

| | | |
|---|---|---|
| DE | 3730523 A1 | 3/1989 |
| DE | 3817770 A1 | 11/1989 |
| DE | 3942836 A1 | 6/1991 |
| DE | 4308811 A1 | 1/1994 |
| DE | 10112639 A1 | 9/2002 |
| DE | 10127284 A1 | 12/2002 |
| EP | 1128049 A2 | 8/2001 |
| EP | 1162360 A2 | 12/2001 |
| GB | 2 287 101 A | 9/1995 |
| WO | 0188590 A1 | 11/2001 |
| WO | 2004097493 A1 | 11/2004 |

OTHER PUBLICATIONS

European Search Report dated Sep. 14, 2009.
European Search Report dated Feb. 18, 2010.

* cited by examiner

METHOD FOR CHECKING A VALVE

CROSS-REFERENCE TO RELATED APPLICATION

This application claims the priority, under 35 U.S.C. §119, of German application DE 10 2005 050 338.1, filed Oct. 20, 2005; the prior application is herewith incorporated by reference in its entirety.

BACKGROUND OF THE INVENTION

Field of the Invention

The invention relates to a method for checking a valve, in particular a magnetically bistable solenoid valve for an injection valve of an internal combustion engine in a motor vehicle.

Internal combustion engines, in particular those in motor vehicles, are subject to very stringent requirements. Pollutant emissions are defined by legal provisions and customers want low fuel consumption and safe and reliable operation. Directly injecting the fuel into the respective combustion chamber of the internal combustion engine at high pressure, e.g. at over 2000 bar in the case of diesel or over 100 bar in the case of petrol, and optionally also supplying the fuel in a number of partial injections for each injection process, can improve the prepared mixture, thereby reducing fuel consumption and the development of pollutant emissions. The requirements relating to the precision and dynamic of the injection valves are therefore very stringent. Valve response times of around 100 to 500 microseconds for example are required, so that small quantities of fuel, for example a few micrograms, can be injected precisely at high fuel pressures. In the case of diesel automobile engines, the injection valves have a piezoactuator to operate the valve. But injection valves with piezoactuators are expensive. Injection valves with magnetic actuators however do not achieve the required valve response times.

For large-volume, slow-moving diesel truck engines, for example a six-cylinder engine with a nine liters displacement and an operating speed of maximum 1,800 revolutions per minute, valve response time requirements are less stringent. In order to be able to measure in a predetermined quantity of fuel precisely, it is essential to know a time period for which the valve is open and the valve response time as precisely as possible.

SUMMARY OF THE INVENTION

It is accordingly an object of the invention to provide a method for checking a valve that overcomes the above-mentioned disadvantages of the prior art methods of this general type, which is simple and reliable.

With the foregoing and other objects in view there is provided, in accordance with the invention, a method for checking a valve having a valve piston being moved in dependence on valve activation to open and close the valve. The valve further has at least one coil and at least one magnetized component. The valve induces an induction voltage in the at least one coil upon a movement of the valve piston in the valve through a magnetic field produced by the magnetized component. The method includes the steps of acquiring a reference point being representative of a start of a current activation cycle of the valve and during the current activation cycle, determining a point being dependent on a characteristic pattern of the induction voltage. The point is representative of an end of a movement process of the valve piston in the valve. A current response time is determined as a function of the point and the reference point. At least one error condition is determined as a function of the current response time, and an error is identified, when the at least one error condition is satisfied.

The invention is characterized by a method for checking a valve with a valve piston, which can be moved in dependence on valve activation to open and close the valve. The valve contains at least one coil and at least one magnetized component. The valve is configured such that an induction voltage is induced in the at least one coil by movement of the valve piston in the valve through a magnetic field produced by the magnetized component. A reference point is acquired, which is representative of a start of the current activation cycle of the valve. In the current activation cycle a point is determined as a function of a characteristic pattern of the induction voltage, the point being representative of an end of a movement process of the valve piston in the valve. A current response time is determined as a function of the point and reference point. At least one error condition is determined in dependence on the response time. An error is identified, when the at least one error condition is satisfied.

The advantage is that the valve error can be identified simply and reliably as a function of the response time. A mechanical malfunction of the valve, e.g. due to hydraulic adhesion of the valve piston, in particular can be reliably identified. If the valve for example is part of an injection valve of an internal combustion engine in a motor vehicle, the valve error can result in increased pollutant emissions. By identifying the error it is possible to signal the error to the vehicle driver, so that the error can be eliminated in a workshop.

In an advantageous refinement of the invention the at least one error condition is satisfied, when the response time is greater than a predetermined first threshold value. This has the advantage that an absence of the movement process of the valve piston or a delayed movement process can very simply be identified as an error.

In a further advantageous refinement of the invention a current sliding mean value is determined as a function of the current response time and a predetermined number of activation cycles before the respective response time. The at least one error condition is satisfied, when the sum of the difference between the current response time and the current sliding mean value or a sliding mean value determined for a previous activation cycle is greater than a predetermined second threshold value. This has the advantage that fluctuations in the response time of the valve can be identified simply and reliably as errors. It is then possible to initiate maintenance or repair of the valve, before the valve fails.

In a further advantageous refinement of the invention the current sliding mean value is determined as a function of the current response time and the predetermined number of activation cycles before the respective response time. The current sliding mean value is stored. A variable is determined as a function of the current sliding mean value and at least one previously stored sliding mean value, the variable being representative of a current rate of change of the sliding mean value. The at least one error condition is satisfied, when the variable is greater than a predetermined third threshold value. This has the advantage that it can be identified before the valve fails that the characteristics of the valve are changing such that it can be assumed that the valve will fail in the near future. For example the response time lengthens due to wear as the age of the valve increases. It is therefore possible to initiate maintenance or repair or replacement of the valve at an early stage.

In a further advantageous refinement of the invention the error is only identified in each instance, when the at least one error condition is satisfied within a predetermined maximum error interval for at least one predetermined error number. The advantage is that infrequently occurring outlying values of the response time do not result in an error message. This prevents unnecessary error messages and in some instances also unnecessary maintenance work.

In a further advantageous refinement of the invention the method is implemented, when predetermined operating conditions of the valve prevail. This has the advantage that the determined response time or the sliding mean value of the current activation cycle can be compared particularly readily with previously determined response times or sliding mean values. The valve check is therefore particularly reliable.

In a further advantageous refinement of the invention the response times or the sliding mean value are corrected as a function of the operating conditions of the valve currently prevailing. This has the advantage that response times and sliding mean values determined under different operating conditions can be readily compared with each other and the valve check is therefore particularly reliable.

Other features which are considered as characteristic for the invention are set forth in the appended claims.

Although the invention is illustrated and described herein as embodied in a method for checking a valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a valve, e.g. a control valve for an injection valve for an internal combustion engine in a motor vehicle. The valve has a valve housing 1, with a recess, in which a valve piston 2 is disposed in such a manner that it can be moved axially. The valve has an inlet 3 and two outlets 4, configured in the valve housing 1. Drains 5 are also configured in the valve housing 1. The inlet 3 can be coupled for example to a non-illustrated fluid tank, from which fluid, e.g. hydraulic oil or engine oil can be supplied to the valve. The outlets 4 open for example into a non-illustrated control chamber, with an adjacent hydraulic stamp for example, which can be moved as a function of a fluid pressure in the control chamber to open and close the injection valve.

Figure 1:
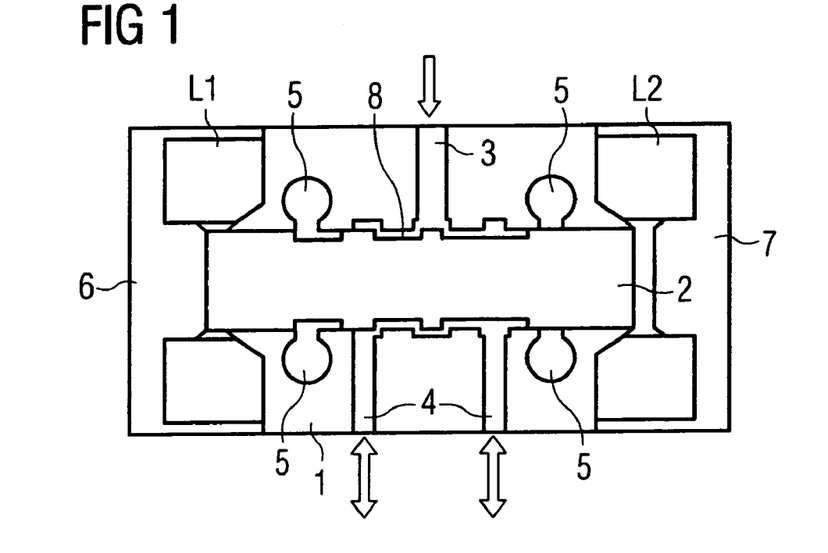
FIG. 1 is a diagrammatic, illustration of a valve.

Depending on an axial position of the valve piston 2 in the recess of the valve housing 1, either the inlet 3 is coupled hydraulically by way of grooves 8, configured in the valve piston 2 and valve housing 1, to the outlets 4 or the outlets 4 are coupled to the drains 5. The fluid can flow out of the control chamber through the drains 5.

The valve has a first cap 6 and a second cap 7, disposed respectively at an axial end of the valve. The first cap 6 and the second cap 7 define the lift of the valve piston 2 in the valve housing 1. A first coil L1 is disposed adjacent to the first cap 6 and a second coil L2 is disposed adjacent to the second cap 7. It is possible to establish a magnetic field by energizing the first coil L1 or second coil appropriately, such that the valve piston 2 is attracted by this and moved towards the lift limit formed by the first cap 6 or second cap 7. The first cap 6 and second cap 7 are preferably configured such that even when the energization of the first coil L1 or second coil L2 ceases, a remanent magnetic field remains due to corresponding magnetization of the first cap 6 or second cap 7. The valve piston 2 can therefore maintain its current position at the first cap 6 or second cap 7, until the valve piston 2 is attracted by the energization of the respectively opposite coil to the cap assigned to the coil. The valve therefore forms a magnetically bistable solenoid valve. The valve can however also be configured differently.

Figure 2:
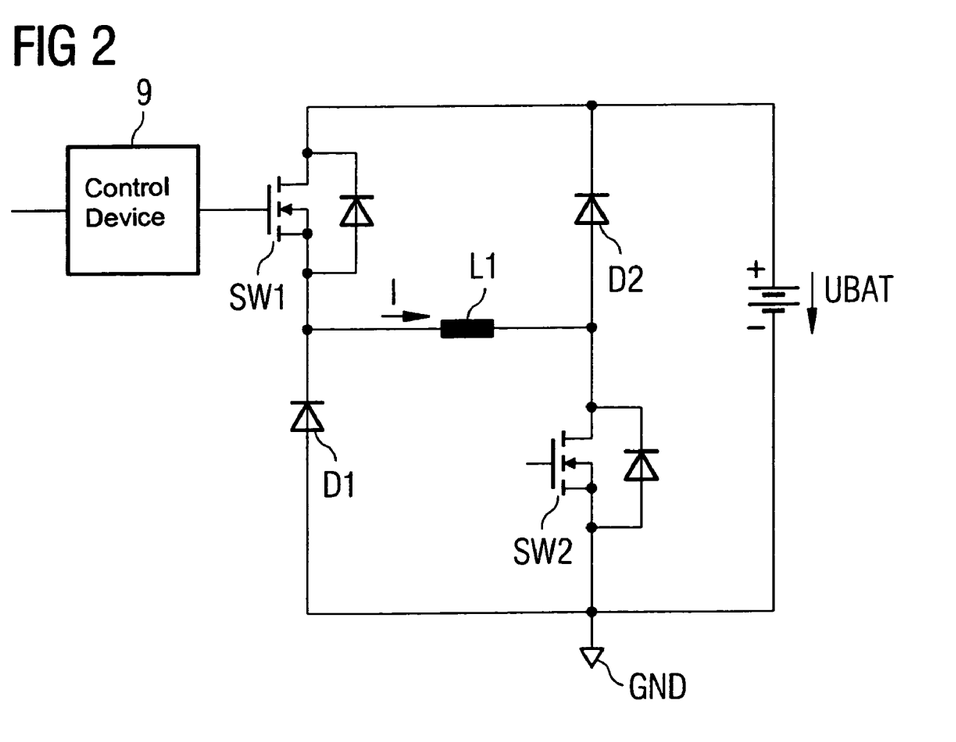
FIG. 2 is a circuit configuration for activating the valve.

FIG. 2 shows a circuit configuration, which is configured to activate the valve. The circuit configuration has a control device 9, which for example generates a pulse-width modulated control signal, which is fed to a first switch SW1. The first switch SW1 is disposed electrically between a positive potential of a battery voltage UBAT and a first terminal of the first coil L1. The battery voltage UBAT is for example around 24 volts. The first switch SW1 and the first terminal of the first coil L1 are also coupled by way of a first diode D1 disposed in the non-conducting direction to a negative potential of the battery voltage UBAT, referred to as a ground potential GND.

A second terminal of the first coil L1 is coupled by way of a second switch SW2 to the ground potential GND. The second switch SW2 is provided for valve selection, when further valves are activated by the control device 9. The second terminal of the first coil L1 is also coupled by way of a second diode D2, connected in the non-conducting direction, to the positive potential of the battery voltage UBAT. The first switch SW1, the second switch SW2, the first diode D1 and the second diode D2 are provided correspondingly for the second coil L2. The control device 9 is preferably configured also to generate the pulse-width modulated control signal correspondingly for the second coil L2.

Figure 3:
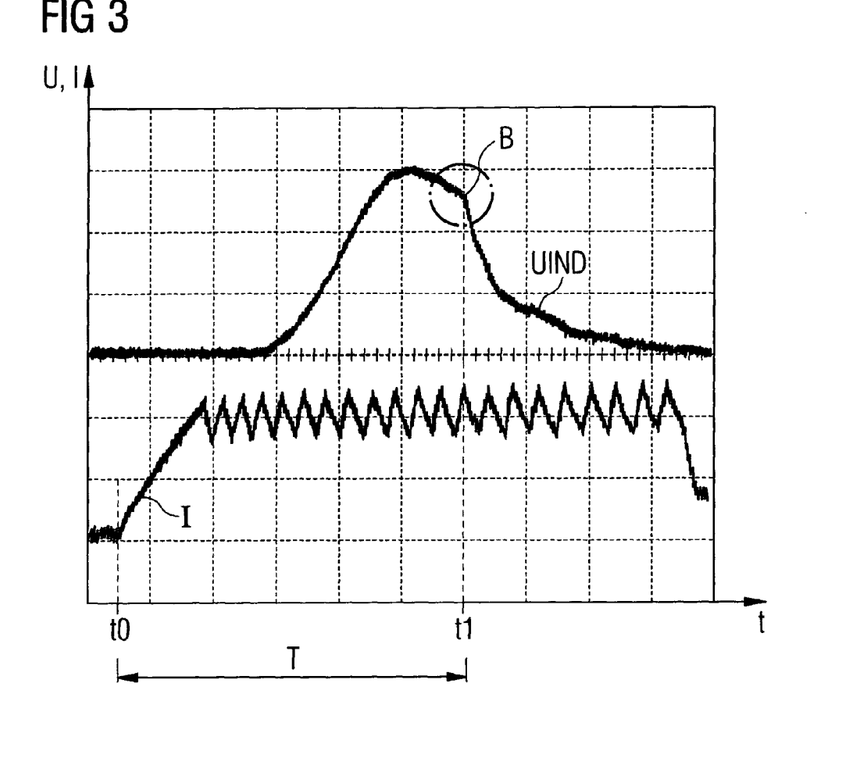
FIG. 3 is a graph showing a current-time and voltage-time.

The first coil L1 and the second coil L2 are preferably energized alternately, such that the valve piston 2 is moved into the respectively other axial position at the first cap 6 or the second cap 7. The respectively unenergized coil is preferably used to acquire the movement of the valve piston 2 in the valve housing 1. Because the first cap 6 and second cap 7 or even the valve housing 1 or valve piston 2 are magnetized, the movement of the valve piston 2 through the prevailing magnetic field can cause an induction voltage UIND to be induced in the first coil L1 and in the second coil L2 (FIG. 3). The induction voltage UIND can be acquired particularly easily in the respectively unenergized coil.

FIG. 3 shows a diagram of a pattern of an electric current I through the first coil L1 or the second coil L2 during energization. Energization of the respective coil starts at a reference point t0 on activation of the first switch SW1 and second switch SW2 assigned to the respective coil. The reference point t0 is representative of a start of a current activation cycle of the valve. The electric current I increases, until a predetermined current is reached. The current I is then maintained by alternately activating and deactivating the first switch SW1 in a predetermined range. When the valve piston 2 starts to move through the prevailing magnetic field, the induction voltage UIND is induced in the respectively unenergized coil. If at a point t1 the valve piston 2 strikes the lift limit formed by the first cap 6 or second cap 7, the induction voltage UIND shows a characteristic pattern in the form of a knee B. The knee B is caused by the end of the movement of the valve piston 2. As the induction voltage UIND is not further induced after the point t1, it drops faster after the point t1 than before the first point t1. The end of the movement of the valve piston 2 can therefore be identified by identifying the knee B in the pattern of the induction voltage UIND. The point t1 is representative of the end of the movement process of the valve piston 2 in the valve. The current activation cycle is terminated by termination of the energization of the first coil L1 or second coil L2.

Figure 4:
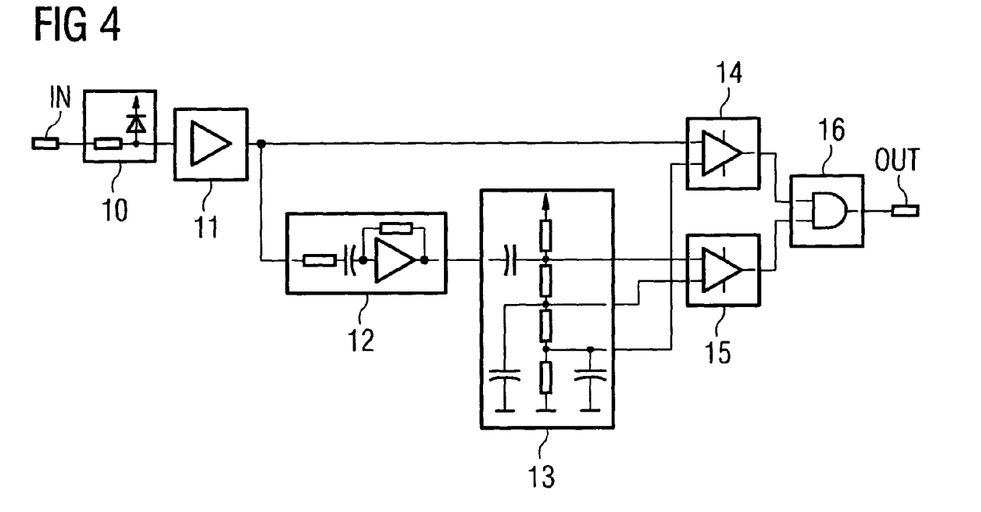
FIG. 4 is a block circuit diagram of a device for identifying an end of a movement of a valve piston in the valve.

FIG. 4 shows a block circuit diagram of a device for identifying the end of the movement of the valve piston 2 in the valve. The device has an input IN, by way of which the induction voltage UIND can be supplied to the device. A protection circuit 10 is provided on the input side of the device, to protect the device from too large an input voltage at the input IN and thus to prevent damage to the device. The protection circuit 10 is coupled to a buffer 11. The induction voltage UIND can be picked up on the output side of the buffer 11.

The buffer 11 is coupled to a differentiator 12, which forms a first offtake of the induction voltage UIND as a function of time and supplies this on the output side. A reference generator 13 is also provided in the device, generating and predetermining a predetermined induction voltage threshold value and a predetermined offtake threshold value.

A first comparator 14 is provided to compare the induction voltage UIND with the predetermined induction voltage threshold value. A second comparator 15 is provided to compare the first offtake of the induction voltage UIND with the predetermined offtake threshold value. The first comparator 14 and the second comparator 15 are linked logically on the output side by way of an AND element 16. An output OUT of the device is formed by an output of the AND element 16. Identification of the end of the movement of the valve piston 2 is signaled at the output OUT, when the induction voltage UIND is greater than the predetermined induction voltage threshold value and the first offtake of the induction voltage UIND drops below the predetermined offtake threshold value.

The signal at the output OUT, e.g. an output pulse at or shortly after the point t1, can for example be fed to the control device 9, which is configured to activate the valve such that for example a predetermined quantity of fuel is injected. A method corresponding to the block circuit diagram can however similarly be provided, for example in the form of a program executed by the control device 9. The knee B in the pattern of the induction voltage UIND can however also be identified by a differently configured device or by a different method.

Figure 5:
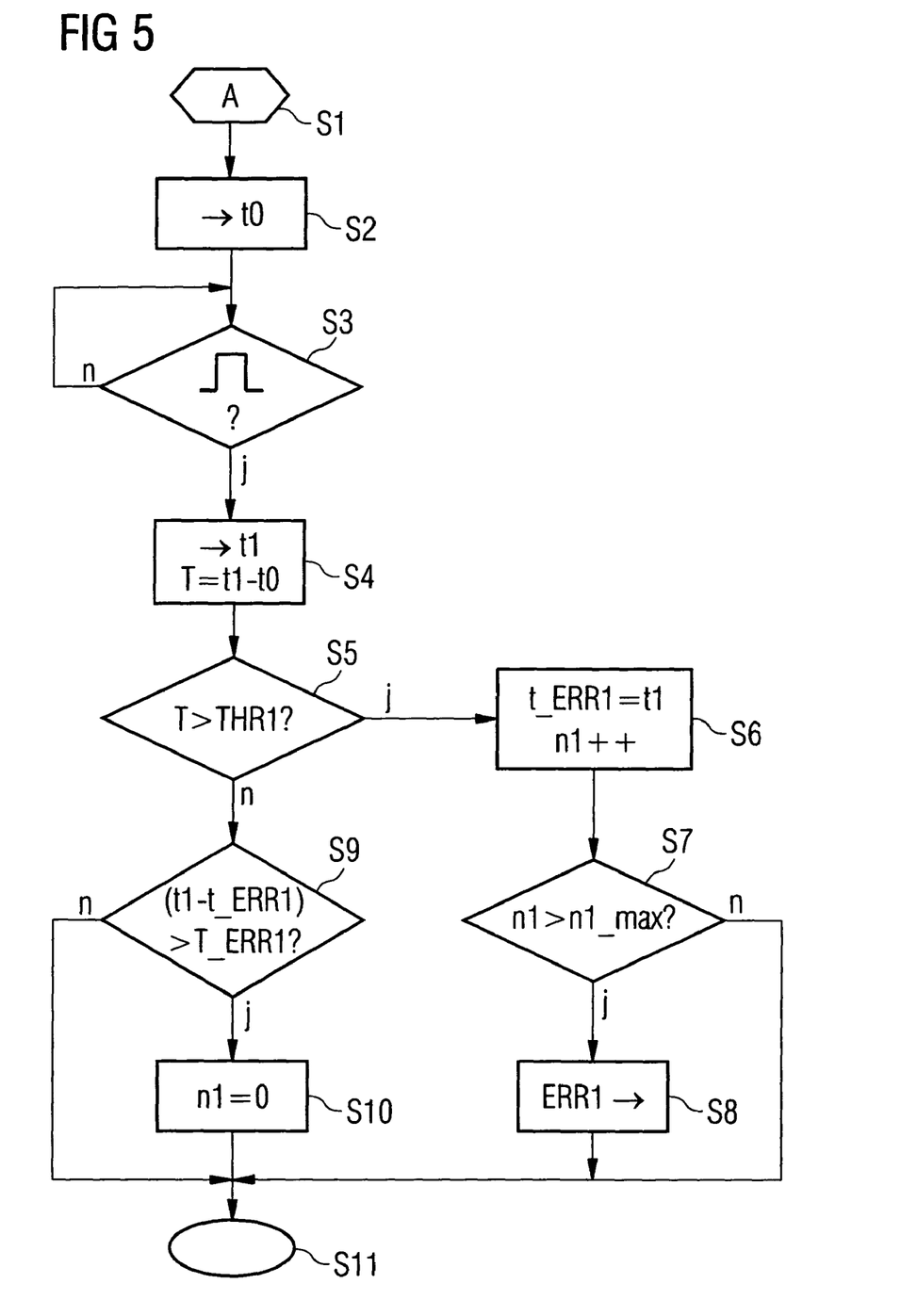
FIG. 5 is a first flow chart.

FIG. 5 shows a first flow diagram of a first method for checking the valve. The first method starts in a step S1. The step S1 is preferably executed at the start of the current activation cycle. The reference point t0 is acquired in a step S2. In a step S3 it is checked whether the knee B has occurred in the pattern of the induction voltage UIND. For example it is checked in step S3 whether the output pulse, in other words the signal for identifying the end of the movement of the valve piston 2 in the valve, has occurred at the output OUT of the device shown in FIG. 4. The step S3 is repeated until the end of the movement of the valve piston 2 has been identified or the repetition is terminated because a predetermined maximum time period since the start of the current activation cycle has been exceeded.

In a step S4 the point t1 is acquired. A current response time T is also determined as a function of the point t1 and the reference point t0, for example as a difference between the point t1 and the reference point t0. In a step S5 it is checked whether a first error condition is satisfied. The first error condition is satisfied, when the response time T is greater than a predetermined first threshold value THR1.

If the first error condition is satisfied, in a step S6 the point t1 is stored as a first error point t_ERR1 and a first error number n1 is increased, for example by one. In a step S7 it is checked whether the first error number n1 is greater than a predetermined first maximum error number n1_max. If this condition is satisfied, in a step S8 a first error ERR1 of the valve is identified and the first method is terminated in a step S11. If the condition in step S7 is not satisfied, the first method is similarly terminated in step S11.

If the first error condition is not satisfied in step S5, in other words the current response time T is shorter than or equal to the predetermined first threshold value THR1, it is checked in a step S9 whether a difference between the point t1 and the first error point t_ERR1 is greater than a predetermined first maximum error interval T_ERR1. The predetermined first maximum error interval T_ERR1 is a time period, during which the first error condition in step S5 has to be satisfied for at least the predetermined first maximum error number n1_max, to identify the error or the valve. Therefore in a step S10 the first error number n1 is set to a neutral value, for example zero, when the difference between the point t1 and the first error point t_ERR1 is greater than the predetermined first maximum error interval T_ERR1. The first method is terminated after step S10 in step S11. The first method is similarly terminated in step S11, when the condition in step S9 is not satisfied.

Figure 6:
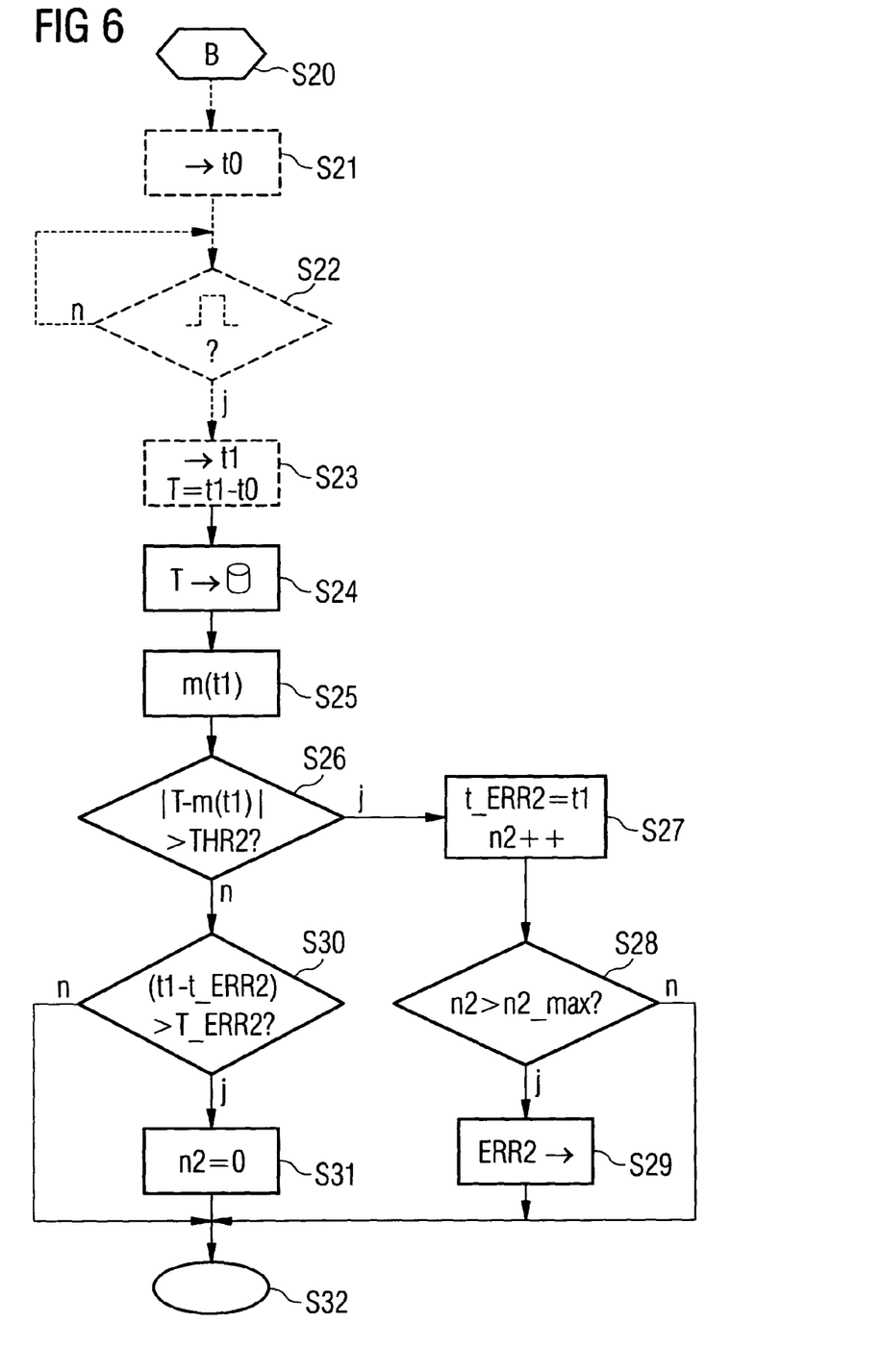
FIG. 6 is a second flow chart.

FIG. 6 shows a second flow diagram of a second method for checking the valve. The second method starts in step S20, which like the step S1 is executed at the start of the current activation cycle. The reference point t0 is acquired in step S21 as in step S2. In step S22 the end of the movement of the valve piston in the valve is identified as in step S3. In step S23 the point t1 and response time T are determined as in step S4. The response time T is stored in a step S24. In step S25 a current sliding mean value m is determined as a function of the current response time T and a predetermined number of activation cycles before the respectively stored response time. For example around ten or twenty previous activation cycles are taken into account when determining the current sliding mean value m.

In step S26 it is checked, whether a second error condition is satisfied. The second error condition is satisfied in step S26, when the sum of a difference between the current response time T and either the current sliding mean value m, which therefore includes the current response time T, or a sliding mean value determined for a previous activation cycle, which does not include the current response time T, is greater than a predetermined second threshold value THR2. If the second error condition is satisfied, in a step S27 the point t1 is stored as a second error point t_ERR2 and a second error number n2 is increased, for example by one. In step S28 it is checked whether the second error number n2 is greater than a predetermined second maximum error number n2_max. If this condition is satisfied, in step S29 a second error ERR2 is identified and the second method is terminated in a step S32. The second method is similarly terminated in step S32, if the condition in step S28 is not satisfied.

If the second error condition in step S26 is not satisfied, in other words the sum of the difference between the current response time T and either the current sliding mean value m or the sliding mean value determined for the previous activation cycle is smaller than or equal to the predetermined second threshold value THR2, in step S30 it is checked whether a difference between the point t1 and the second error point t_ERR2 is greater than a predetermined second maximum error interval T_ERR2. If this condition is satisfied, in step S31 the second error number n2 is set to a neutral value, e.g. zero. The second method is terminated in step S32. The second method is similarly terminated in step S32, if the condition in step S30 is not satisfied.

The second error ERR2 represents a fluctuation of the response time T. The fluctuating response time T can result in corresponding fluctuations of the quantity of fuel measured in. This can increase pollutant emissions in the internal combustion engine.

Figure 7:
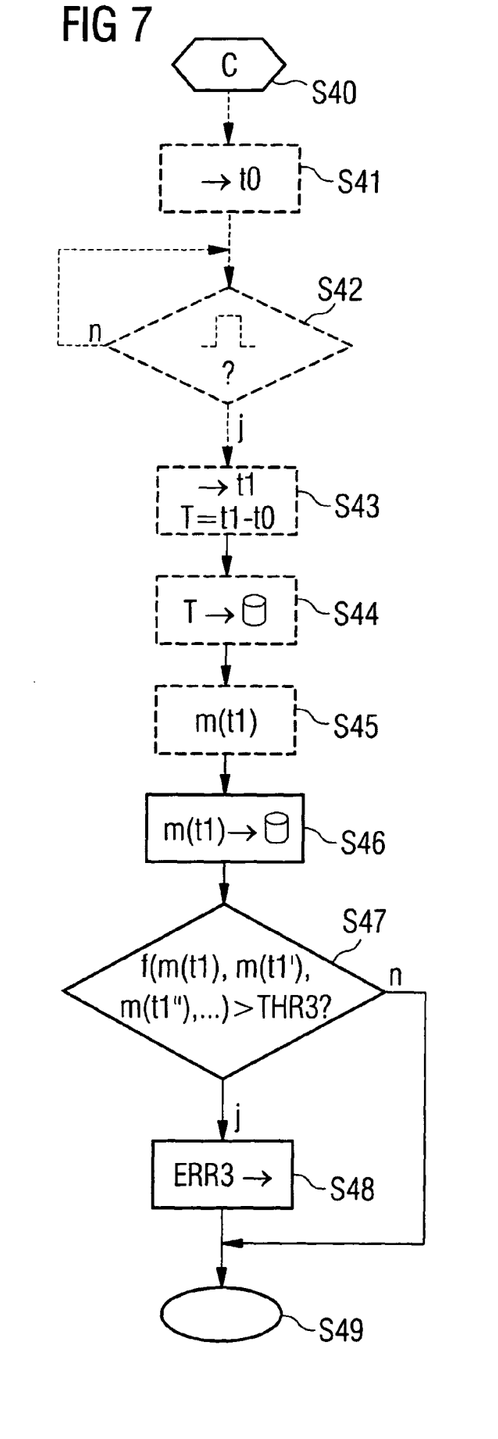
FIG. 7 is a third flow chart.

FIG. 7 shows a third flow diagram of a third method for checking the valve. The third method starts in step S40, which is executed in the same manner as step S1 or step S20. Step S40 is however preferably executed less frequently than step S1 or step S20, for example only once per hour of operation of the valve or once per operation of the valve, e.g. each time the valve starts to operate. In step S41 the reference point t0 is acquired as in step S21. In step S42 the end of the movement of the valve piston 2 in the valve is acquired as in step S22. In step S43 the point t1 and the response time T are determined as in step S23. In step S44 the response time T is stored as in step S24 and in step S45 the current sliding mean value m is determined as in step S25.

In step S46 the current sliding mean value m is stored. In step S47 it is checked whether a third error condition is satisfied. The third error condition is satisfied, when a variable, which is representative of a current rate of change of the sliding mean value, is greater than a predetermined third threshold value THR3. The variable is determined as a function of the current sliding mean value m and at least one already previously stored sliding mean value. The mean values taken into account when determining the variable are preferably random samples of the respective current sliding mean value m, which are stored over fairly long time periods, for example months or years or as a function of the operating time of the valve. The third method utilizes the knowledge that the response time of the valve changes slowly due to wear but the change accelerates, when valve failure is imminent. If the third error condition is satisfied in step S47, in step S48 a third error ERR3 is identified and the third method is terminated in a step S49. The third method is similarly terminated in step S49, if the condition in step S47 is not satisfied.

As with the first method and the second method, the third method can also be extended such that the third error ERR3 is only identified, if the third error condition is satisfied within a further predetermined maximum error interval for at least one further predetermined error number.

Figure 8:
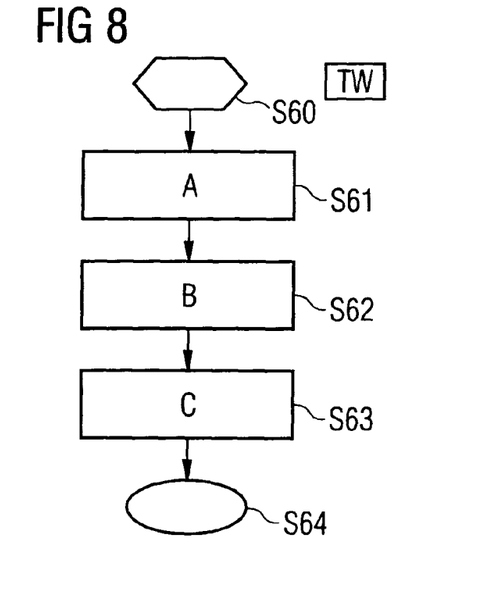
FIG. 8 is a fourth flow chart.

FIG. 8 shows a fourth flow diagram of a fourth method for checking the valve. The fourth method includes the first, second and third methods. The method starts in step S60. The first method is executed in a step S61. The second method is executed in step S62 and the third method is executed in step S63. The fourth method is terminated in a step S64 and optionally continues after a waiting period TW in step S60.

The steps S2, S3 and S4 are preferably executed in a common manner for the first, second and third methods such that steps S21, S22 and S23 and steps S41, S42 and S43 do not have to be re-executed. Correspondingly steps S44 and S45 do not have to be re-executed, if steps S24 and S25 have already been executed.

The first, second and third methods respectively can be executed independently of the other two methods in each instance. These methods can similarly be executed in any combinations. The sequence of execution can thereby be selected at will.

The first, second, third or fourth method are preferably executed when predetermined operating conditions of the valve prevail, for example at a predetermined temperature. Therefore, the response times or sliding mean values determined in different activation cycles can be particularly readily compared. Alternatively the current response time T or the current sliding mean value m is corrected as a function of currently prevailing operating conditions of the valve. This correction can for example be carried out in relation to a reference temperature.

I claim:

1. A method for checking a magnetically bistable solenoid valve having two defined ends of movement and a valve piston moved in dependence on valve activation to open and close the valve, the method comprising the steps of:
   providing a magnetically bistable solenoid valve including at least a first coil and a second coil and at least one magnetized component;
   inducing an induction voltage in one of the first coil or the second coil of the valve upon a movement of the valve piston through a magnetic field produced by the magnetized component while the other one of the first coil and the second coil is energized;
   acquiring a reference point representing a point in time at which the energization of said other one of the first coil and the second coil starts;
   while said other one of the first coil and the second coil is energized during the current activation cycle, determining a point in time at which a particular characteristic pattern occurs in the induction voltage induced in said one of the first coil and the second coil by movement of the valve piston in the valve towards a one of the two defined ends of movement proximal to the energized said other one of the first coil and the second coil, the point representing an end of a movement process of the valve piston in the valve;
   determining a current response time as a function of the point and the reference point;
   determining at least one error condition as a function of the current response time; and
   identifying an error, when the at least one error condition is satisfied.

2. The method according to claim 1, which further comprises satisfying the at least one error condition if the current response time is greater than a predetermined first threshold value.

3. The method according to claim 1, which further comprises:
   determining a current sliding mean value in dependence on the current response time and a predetermined number of activation cycles before a respective response time; and
   satisfying the at least one error condition if a sum of a difference between the current response time and the current sliding mean value or a sliding mean value determined for a previous activation cycle is greater than a predetermined second threshold value.

4. The method according to claim 1, which further comprises:
- determining a current sliding mean value in dependence on the current response time and a predetermined number of activation cycles before a respective response time;
- storing the current sliding mean value;
- determining a variable as a function of the current sliding mean value and at least one already previously stored sliding mean value, the variable being representative of a current rate of change of the current sliding mean value; and
- satisfying the at least one error condition if the variable is greater than a predetermined third threshold value.

5. The method according to claim 1, which further comprises identifying the error only in each instance, when the at least one error condition is satisfied within a predetermined maximum error interval for at least one predetermined error number.

6. The method according to claim 1, which further comprises performing the method when predetermined operating conditions of the valve prevail.

7. The method according to claim 4, which further comprises correcting the current response time or the current sliding mean value in dependence on currently prevailing operating conditions of the valve.

8. A method for checking a magnetically bistable solenoid valve having two defined ends of movement, and a valve piston moved in dependence on valve activation to open and close the valve, the method comprising the steps of:
- providing a magnetically bistable solenoid valve including at least a first coil and a second coil and at least one magnetized component;
- energizing the first coil to move the valve piston through a magnetic field produced by the magnetized component towards the energized first coil, thus inducing an induction voltage in the second coil;
- acquiring a reference point indicating a point in time at which the energization of the first coil started;
- while the first coil is energized, determining a point in time at which a particular characteristic pattern occurs in the induction voltage induced in the second coil by movement of the valve piston through the magnetic field towards the energized first coil, the point representing an end of a movement process of the valve piston in the valve;
- determining a current response time as a function of the time between the point and the reference point; and
- determining at least one error condition as a function of the current response time.

9. The method according to claim 8, which further comprises satisfying the at least one error condition if the current response time is greater than a predetermined first threshold value.

10. The method according to claim 8, which further comprises:
- determining a current sliding mean value in dependence on the current response time and a predetermined number of activation cycles before a respective response time; and
- satisfying the at least one error condition if a sum of a difference between the current response time and the current sliding mean value or a sliding mean value determined for a previous activation cycle is greater than a predetermined second threshold value.

11. The method according to claim 8, which further comprises:
- determining a current sliding mean value in dependence on the current response time and a predetermined number of activation cycles before a respective response time;
- storing the current sliding mean value;
- determining a variable as a function of the current sliding mean value and at least one already previously stored sliding mean value, the variable being representative of a current rate of change of the current sliding mean value; and
- satisfying the at least one error condition if the variable is greater than a predetermined third threshold value.

12. The method according to claim 8, which further comprises identifying the error only in each instance, when the at least one error condition is satisfied within a predetermined maximum error interval for at least one predetermined error number.

13. The method according to claim 8, which further comprises performing the method when predetermined operating conditions of the valve prevail.

14. The method according to claim 11, which further comprises correcting the current response time or the current sliding mean value in dependence on currently prevailing operating conditions of the valve.

* * * * *